Jan. 24, 1956  A. J. SICILIANO  2,732,096
EGG BASKET WITH HANDLE
Filed Dec. 12, 1951

INVENTOR
Anthony J. Siciliano.
BY
ATTORNEY

United States Patent Office 2,732,096
Patented Jan. 24, 1956

2,732,096

EGG BASKET WITH HANDLE

Anthony J. Siciliano, Vineland, N. J., assignor to Keen Manufacturing Corporation, Vineland, N. J., a corporation of New Jersey Application December 12, 1951, Serial No. 261,210

1 Claim. (Cl. 220—95)

The present invention relates to baskets and like receptacles for eggs and similar fragile articles, and the principal object of the invention is to provide a container of suitable capacity for holding such a quantity of articles as can be conveniently lifted by a person, by means of a handle formed on the container, without imposing on the articles any compressive stresses which would damage them.

In the handling of eggs, particularly in the collection of eggs in commercial poultry installations, it is customary to use relatively large baskets for holding a considerable number, i. e., sometimes as many as a hundred or more, into which the attendant puts the eggs as he takes them from the nests or batteries, and in which he carries them to a central point for cleaning, crating and packing into crates. The baskets are desirably made light in weight, but this results in structural weaknesses so that when a basket is raised by pulling on a conventional type handle the weight of a more or less full load tends to flatten the upper rim to which the ends of the handle are connected, thereby imposing compressive stresses on the uppermost eggs in the basket so that some of them become cracked. The only solution proposed by the prior art, so far as I am aware, is to make the baskets of very heavy, rigid construction, but this has involved the objections of greatly increased weight and higher cost.

The present invention provides a basket or like receptacle of acceptable light weight construction equipped with a novel type of handle by which the receptacle can be lifted without causing any flattening or other distortion of the upper rim from its original circular, elliptical or polygonal shape, so that the contents are not compressed.

A further novel feature consists in so dimensioning and proportioning the handle that when it has dropped down from vertical carrying position to horizontal inoperative position it will be stopped by engagement with the upper rim and lie wholly outside the plan projection of the receptable interior. In other words, the handle when folded down clears the inner area defined by the rim, so that it will not strike and damage any eggs or the like that may be contained within such area and may project above the rim.

Related objects are concerned with making a receptacle of the type indicated which will be simple in construction, light in weight, economical to manufacture and extremely durable in use.

A preferred embodiment of the invention is illustrated in the accompanying drawing, in which Figure 1 is a perspective view of an all-metal basket made in accordance with the principles of the invention, showing the carrying handle in raised position;

Figure 1:
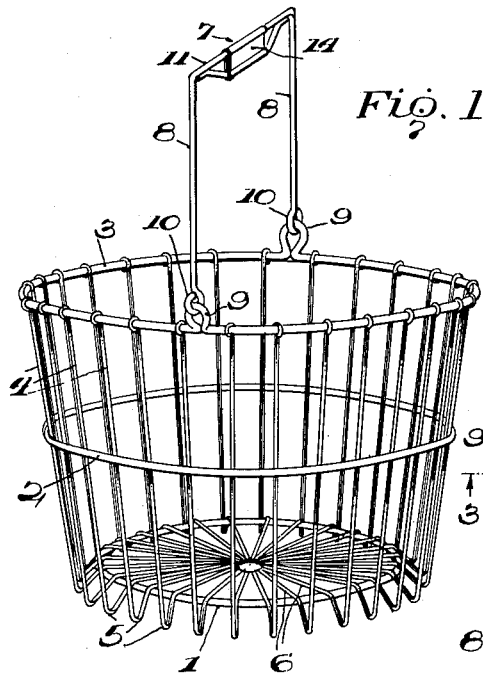

Broadly speaking, the invention comprises forming the handle with a very rigid cross bar having a length equal to the spacing of the two points on opposite sides of the rim at which the handle is connected to the rim, and in making this connection by means of rods which are accurately parallel so that these rods transmit stresses solely in tension along their axes with no sidewise thrust or other component that would result in compression radially of the rim, and the invention further consists in making the connecting rods sufficiently long to cause the inner edge margin of the central portion of the cross bar of the downwardly folded handle to rest on that portion of the rim which is midway between the points at which the rods are connected to the rim so that all of the handle will clear the inner area defined by the rim and hence the falling handle will not strike any of the receptacle contents.

The basket shown in the preferred embodiment illustrated by the drawing is a skeletonized, truncated conical or flaring structure made of relatively light round wire stock comprising a bottom or floor ring 1 of comparatively small diameter, an intermediate ring 2 of larger diameter, and a top ring 3 of still larger diameter which constitutes the rim to which the handle is connected. Suitably secured to these three rings, as by hooking over the top ring and by being spot welded to the other two rings, are side stays 4 in the form of an equally spaced series of rods or wires. The lower portion of these wires may be bent inwardly and upwardly, as shown at 5, to provide a circular footing and then radially inwardly as shown at 6 to form an elevated bottom. The converging ends of the wire portions 6 may be welded together, or they may be caught in the flanges of a large grommet, or they may be clamped between two disks or plates, or they may be held together in any other way. Such details are no part of the invention. Neither is any other feature or detail of the receptacle structure which has thus far been described, since all that the invention requires of the container portion of the basket or other type receptacle is that it be sufficiently light in weight to satisfy the user and that it terminate in an upper rim with which a handle may be engaged. Thus, the bottom and/or side wall of what is shown as a skeletonized or reticulated basket may be made solid and imperforate, and the upper rim need not be circular but may be elliptical, or square, or of other polygonal shape.

The handle, which constitutes the important part of the invention, comprises a generally bail-shaped structure including a cross bar 7 and two connecting rods 8 which extend from the opposite ends of the cross bar downwardly to connections of their free ends with diametrically or perimetrically opposite points on the rim 3. The essential features of the cross bar are (1) that it be quite rigid, i. e., proof against bending under the stress of any load that it may be called upon to support and (2) that it have a length equal to the spacing between the points on the rim 3 to which the free ends of the connecting rods 8 are to be secured. The essential features of the connecting rods are simply (1) that they extend in rather accurate parallelism from the cross bar to the rim and (2) that they be just long enough to bring the inner edge margin of the central portion of the cross bar to rest on that portion of the rim which is midway between the points on the rim at which the rods are connected to the rim when the handle is dropped down to horizontal inoperative position as shown in broken lines in Fig. 2.

The connection of the rods 8 to the rim is conveniently made by fashioning upstanding eyes 9 at diametrically opposite points on the rim and by linking into each of these eyes a similar eye 10 formed on the free end of one of the connecting rods. Any other type of pivoted connection may be substituted.

Figure 3:
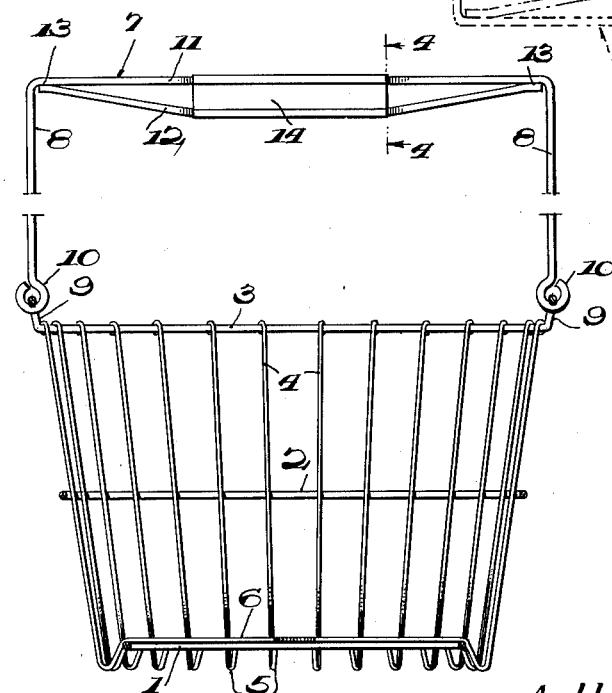
Fig. 3 is a side elevational view on the scale of Fig. 2, with the handle connecting rods broken away for economy of space.
Figure 4:
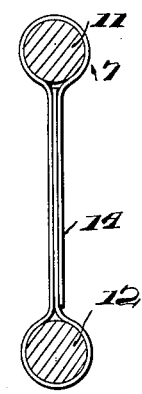
Fig. 4 is a cross sectional view, on a still larger scale, taken on the line 4—4 of Fig. 3.

A preferred manner of imparting sufficient rgidity to the cross bar 7 comprises making it as best shown by Figs. 3 and 4. This consists in forming it as a trussed skeleton framework constituting a sort of beam having as its top or outer element a rod 11 which may be integral with the connecting rods 8 and having as its bottom or inner element a length 12 of similar rod stock which is centrally spaced from the element 11 but has its end portions inclined up to welded or equivalent engagement with the element 11, as shown at 13. The central spacing may be fixed by wrapping a piece of sheet metal 14 about the two rods 11 and 12 and soldering or spot welding the intervening plies together or in some cases simply by relying on the stiffness of the sheet metal to retain the form into which it has been set around the rods.

Such a structure provides a comfortable hand grip by which the handle may be picked up and lifted, and constitutes a sort of truss design which makes the cross bar extremely rigid so that the points 13 remain separated by their original spacing and do not move closer together when the handle is lifted against the weight of any load which the receptacle may be called upon to carry. Thus the connecting rods 8 remain parallel and each of them transmits nothing but tension along its length. These forces reach the two eyes 9 as simple direct upward pulls, with no radial component that would tend to compress the rim 3. Hence the rim maintains its circular or other original form and the eggs or other contents are not compressed or subjected to any other injurious force.

Figure 2:
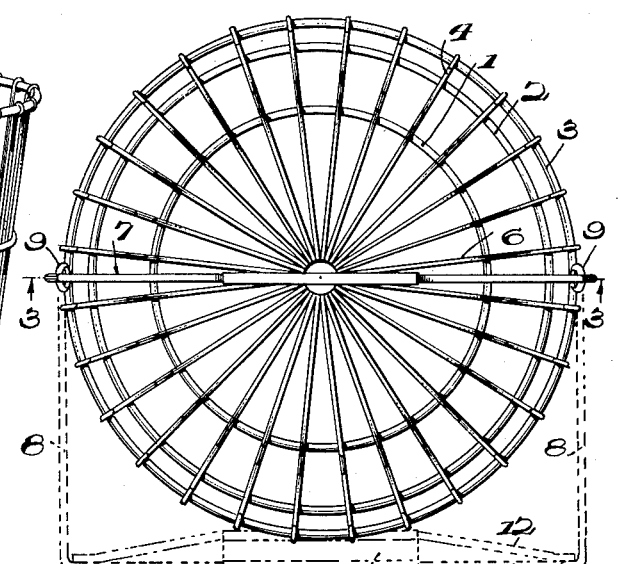
Figure 2 is a top plan view of Fig. 1, on a slightly larger scale, showing in broken lines the handle lowered to inoperative position.

The length of each connecting rod being chosen, as has been explained, appropriately with relation to the diameter or width of the rim 3, it results that the handle, when folded down to horizontal position as shown in broken lines in Fig. 2, will entirely clear the area within the rim, and thus not strike any egg or other lading article with which the receptacle may be heaped up above the level of the rim 3, and will not swing down and strike any article which may project in part between the wires 4 but will be caught and held in horizontal position by engagement of the inner margin of the cross bar on the edge of the rim, as shown in the broken line position in Fig. 2.

It is to be understood that the details of the invention as shown in the illustrated embodiment may be widely varied, particularly in respect of the receptacle portion of the combination, since the invention resides primarily in the handle and its relationship to the receptacle. Thus, for example, the structure need not be made of metal. It is quite possible to provide, out of material other than metal, a cross bar having the requisite rigidity. Since the connecting rods transmit nothing but tension forces along their lengths, these elements may be made of light and not necessarily rigid material. Other changes may be made within the scope of the appended claims without departing from the spirit of the invention.

I claim:

A basket for holding a quantity of eggs or other fragile articles comprising a receptacle having a circular upper rim and a handle comprising a rigid cross bar having a straight portion equal in length to the diameter of the rim, parallel connecting rods depending right-angularly from the ends of the cross bar and pivotally connected at their free ends to diametrically opposite points on said rim, and a brace for the cross bar comprising a stiffening rod having its intermediate portion spaced beneath and parallel to the intermediate portion of the cross bar and having its ends inclined up toward and directly connected to the ends of the cross bar adjacent the junctions thereof with the connecting rods, and a sheet of metal wrapped around the spaced parallel portions of the cross bar and stiffening rod to secure them together, the lengths of the two connecting rods being the same and being such that when the handle is swung down to horizontal position the inner edge margin of the central portion of the brace rests on that portion of the rim which is midway between said opposite points thereon and the entire handle clears the inner area defined by the rim so that no part of the handle impinges on any of the contents of the basket.

References Cited in the file of this patent

UNITED STATES PATENTS

| | | |
|---|---|---|
| 96,889 | Covell | Nov. 16, 1869 |
| 331,447 | Ringden | Dec. 1, 1885 |
| 383,943 | Conde | June 5, 1888 |
| 519,874 | Roberson | May 15, 1894 |
| 1,153,057 | Garritson | Sept. 7, 1915 |
| 1,285,860 | White | Nov. 26, 1918 |
| 1,477,700 | Fuller | Dec. 18, 1923 |
| 1,654,507 | Boe | Dec. 27, 1927 |